United States Patent [19]

Deschamps et al.

[11] Patent Number: 4,650,434

[45] Date of Patent: Mar. 17, 1987

[54] METHOD FOR REPAIRING THE ELECTRODES OF A DISPLAY PANEL

[75] Inventors: Jacques Deschamps, Grenoble; Michel Gay, Le Fontanil; Serge Salavin, Grenoble, all of France

[73] Assignee: Thomson-CSF, Paris, France

[21] Appl. No.: 792,977

[22] Filed: Oct. 30, 1985

[30] Foreign Application Priority Data

Nov. 6, 1984 [FR] France ................................ 84 16876

[51] Int. Cl.⁴ ................................................ H01J 9/50
[52] U.S. Cl. .......................................... 445/2; 445/24; 29/847
[58] Field of Search ....................... 445/2; 29/846, 847; 313/583, 584

[56] References Cited

U.S. PATENT DOCUMENTS 3,061,911 11/1962 Baker ..................................... 29/847
4,304,450 12/1981 Bilsback et al. ........................ 445/2

FOREIGN PATENT DOCUMENTS 95043 6/1982 Japan ..................................... 445/2

OTHER PUBLICATIONS

Proceedings of the Society for Information Display, vol. 21, No. 4, 1980, pp. 333-340, P. Pleshko et al., "Repair of AC Plasma Display Panels".
IBM Technical Disclosure Bulletin, vol. 25, No. 7A, Dec. 1982, pp. 3185-3186, M. J. Costa: "Spare Conductors in Plasma Display Panel".
Patent Abstracts of Japan, vol. 8, No. 97 (P-272) [1534], May 8, 1984, JP-A-599634, (Suwa Seikosha K.K.), 01-19-1984.

Primary Examiner—Kenneth J. Ramsey
Attorney, Agent, or Firm—Roland Plottel

[57] ABSTRACT

Peripheral electrodes formed at the same time as the electrode arrays of a display panel and surrounding each array are cut into at least two segments. Two cut electrodes can thus be repaired together with each peripheral electrode by applying conductive deposits which serve to join the ends of each cut electrode to a peripheral electrode segment.

11 Claims, 4 Drawing Figures

FIG_1
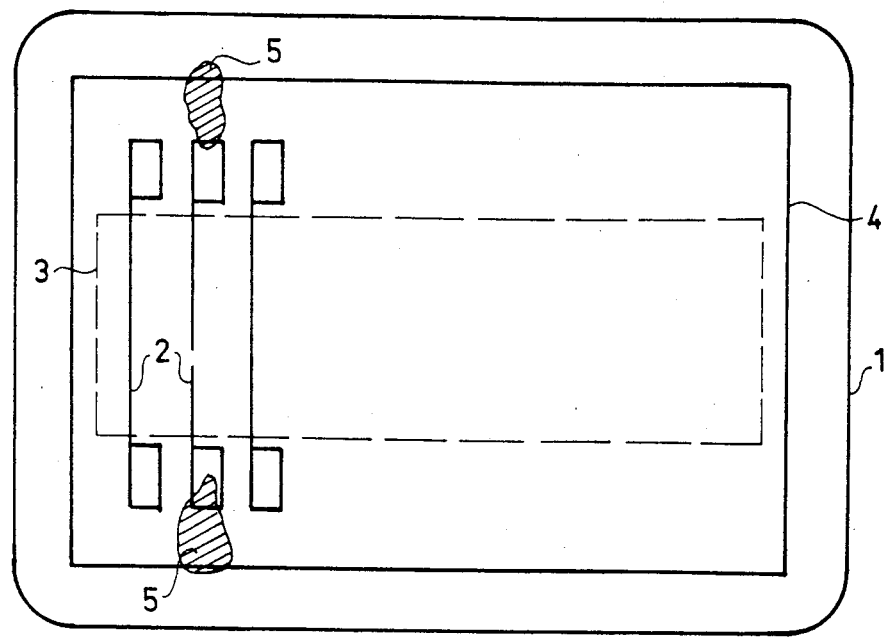
FIG_2
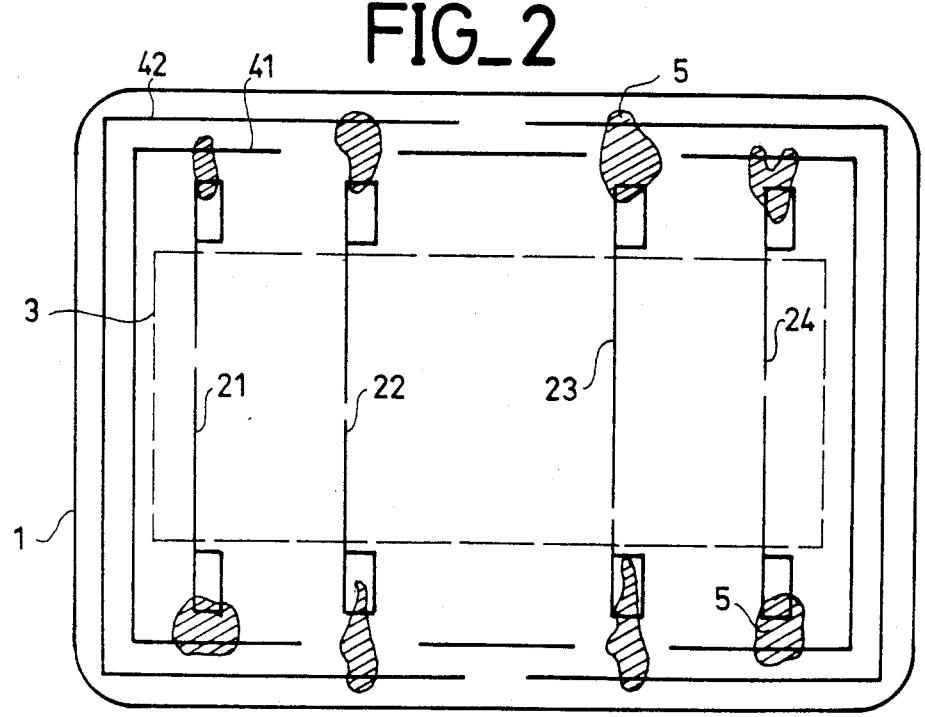

FIG_3
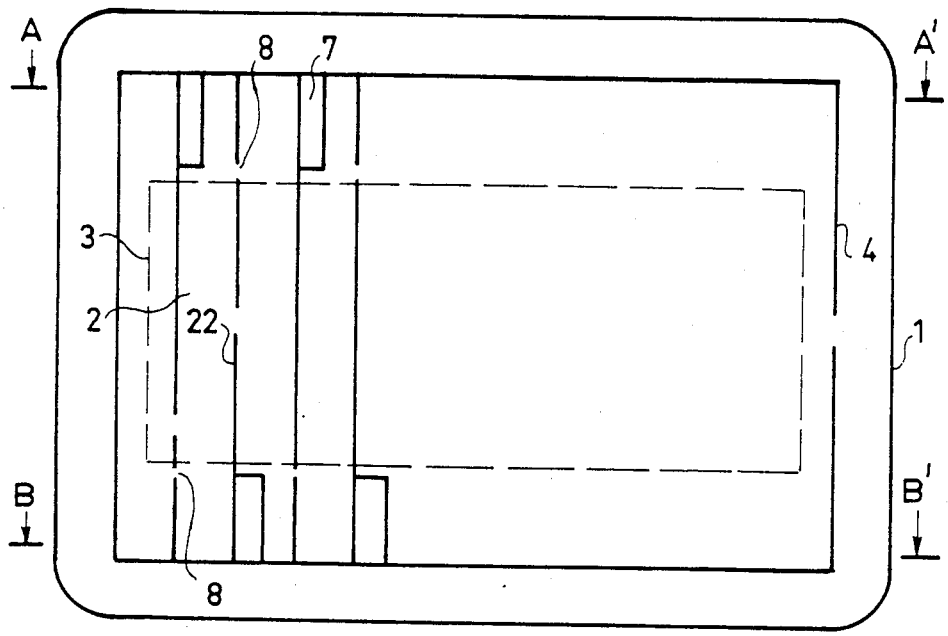
FIG_4
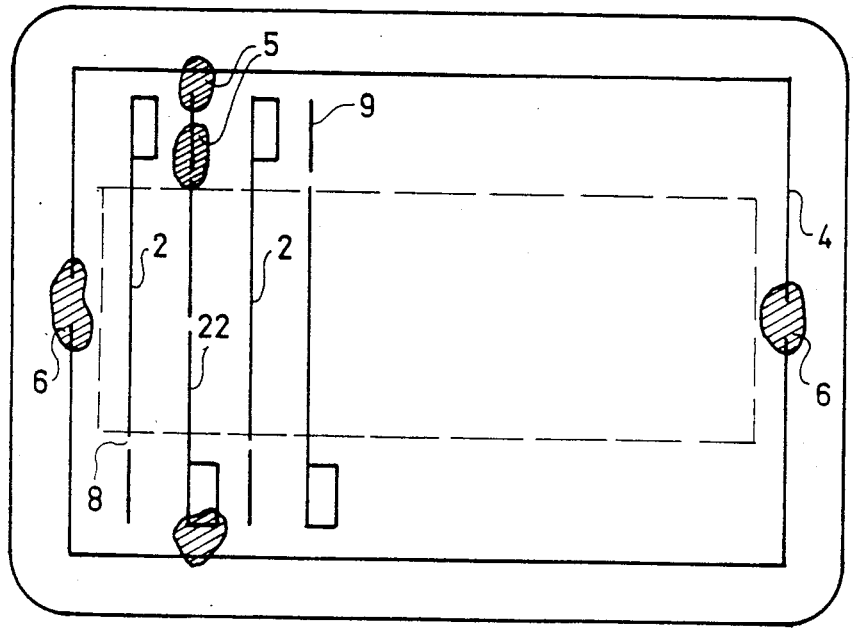

METHOD FOR REPAIRING THE ELECTRODES OF A DISPLAY PANEL

BACKGROUND OF THE INVENTION

1. Field of the Invention

The present invention relates to a method for repairing the electrodes of a display panel.

The display panels to which the method according to the invention applies can consist, for example, of plasma-display panels, electroluminescent panels, liquid-crystal panels, and so on. These panels comprise two arrays of parallel electrodes formed on both faces of the panel, these faces being positioned in such a manner as to ensure that the two arrays of electrodes are at right angles to each other.

These electrodes are of different types and may accordingly be formed of metal, conductive oxide, and so on. They can be fabricated by means of a number of different technologies such as, for example, evaporation, sputtering, screen-process deposition, photoetching, and so on.

Each panel comprises a considerable number of electrodes which commonly runs to several hundreds and sometimes several thousands. Furthermore, these electrodes are often of fairly small width. By way of example, the electrodes provided in plasma-display panels have a width of 50 to 150 $\mu$m with a pitch which varies between 0.2 and 0.6 mm.

The problem which gives rise to concern is the fact that it proves very difficult in practice to construct a display panel in which there is not a single cut electrode.

In the case of fabrication of large-size plasma-display panels, at least one panel out of two on an average comprises one or a number of cut electrodes.

When an electrode is cut, a large part of the electrode does not receive any control signal since electrodes are usually supplied only at one end. In consequence, cutting of an electrode makes it impossible to control several elementary points of the panel, with the result that such a panel is not marketable.

It is possible to restrict the use of display panels solely to those in which no cut electrode is present. However, the production of such panels carries the disadvantage of low efficiency.

This situation consequently points to the advisability of an attempt to repair any electrode cuts which may occur.

2. Description of the Prior Art

In the case of plasma-display panels involving formation of gold electrodes, it is a known practice to repair cuts by depositing a layer of gold on the cut electrodes by hand.

This method does not permit the repair of any cuts which may be detected after voltage has been applied to the panel and which may be caused by the various treatments carried out on the electrodes before the two plates which carry the two arrays of electrodes are hermetically closed by means of a seal.

Finally, this method of repair is not readily applicable to plasma-display panels of the type comprising electrodes in thin layers, and especially electrodes in which provision is made for a top layer of aluminum.

It is a known practice in the prior art to repair cut electrodes by brazing a wire at the unsupplied end of each cut electrode and by connecting said wire to the control signal of the electrode.

This repair can be carried out at any stage of manufacture of the panel since it is only necessary to gain access to the ends of the electrodes, which is possible even after sealing of the panel.

This method of repair by brazed wire is subject in particular to the following disadvantages:

in the case of aluminum electrodes, difficulties are encountered when it is endeavored to produce a satisfactory brazed joint with copper wire, for example, particularly as the electrodes are of small thickness;

there is a potential danger of detachment of the repair wires when the panel is subjected to high stresses, whether such stresses are thermal or mechanical. This is the case when the panel is subjected to vibrations;

it may be difficult to conceal the repair wires from view, especially in the case of panels designed to be observed in transparency;

the presence of repair wires produces changes in level which are liable to hinder the connection of the other contacts;

finally, this repair entails the use of terminals for supplying current to the repair wires whereas these terminals normally have other uses.

SUMMARY OF THE INVENTION

The present invention is directed to a method for repairing cut electrodes which is not attended by the disadvantages of the known methods described in the foregoing.

This invention relates to a method for repairing the electrodes of a display panel, comprising two arrays of electrodes formed on both faces of a panel, said electrodes being supplied at one end, said method being distinguished by the fact that it involves the following steps:

at least one electrode or so-called peripheral electrode is formed on each face of the panel and surrounds each array of electrodes;

both ends of a cut electrode are joined to a peripheral electrode by means of a conductive deposit.

BRIEF DESCRIPTION OF THE DRAWINGS

Other features of the invention will be more apparent upon consideration of the following description, reference being made to FIGS. 1 to 4 of the accompanying drawings which illustrate display panels obtained by means of different alternative embodiments of the method according to the invention.

In the different figures, the same references designate the same elements but the dimensions and proportions of the different elements have not been observed for the sake of enhanced clarity of the drawings.

DESCRIPTION OF THE PREFERRED EMBODIMENTS

FIG. 1 is a schematic representation of one face of a display panel.

This face can be constituted by a glass plate 1 which carries an array of electrodes 2. In order to simplify the figure, only three electrodes are shown and one of these electrodes has a cut. The position of the seal 3 is shown in dashed outline in this figure. The seal determines the panel region which is no longer accessible after the two faces of the panel have been sealed.

In accordance with the invention, a so-called peripheral electrode 4 is usually formed at the same time as the array of electrodes 2 and surrounds this array. The peripheral electrode 4 is therefore located outside the seal since the ends of the electrodes of the array are located outside the seal in order to be accessible after sealing.

In order to repair the cut electrode, its two ends are connected to the peripheral electrode 4. Since one end of the cut electrode receives a control signal, the two connections thus formed serve to supply the entire cut electrode by means of its control signal. The two connections 5 are formed by hand, for example by applying dabs of silver lacquer.

A single peripheral electrode permits the repair of two cut electrodes and a number of peripheral electrodes can be employed as illustrated in FIG. 2. In this figure, there are shown four cut electrodes designated by the references 21, 22, 23, 24 and two peripheral electrodes 41 and 42.

The peripheral electrode 41 is cut into four segments. The two lateral segments are connected to the ends of the electrodes 21 and 24.

The peripheral electrode 42 is cut into two segments to which the electrodes 22 and 23 are connected.

The number of peripheral electrodes formed is a function of the number of repairs which are considered necessary in order to produce a majority of serviceable panels.

It must be ensured that the peripheral electrode located nearest the seal is connected to cut electrodes which are in the least central locations.

The peripheral electrodes can be employed during the fabrication process for the panel-testing operation which consists in short-circuiting the electrodes. In practice, the electrodes are short-circuited in two halves. Thus the even-numbered electrodes and the odd-numbered electrodes are short-circuited separately.

In FIG. 3, there is shown a panel in which the peripheral electrode 4 is cut into two portions and in which each portion short-circuits one-half of the electrodes.

It will of course be readily apparent that the electrodes 2 must be formed so as to be in contact with the peripheral electrodes.

At the end of the fabrication process, the peripheral electrode is closed, for example by means of dabs of silver lacquer 6 as shown in FIG. 4. In addition, short-circuits between the electrodes 2 of the array and the peripheral electrode 4 are eliminated by grinding-down along the axes A—A' and B—B' indicated in FIG. 3.

In order to apply the method of repair in accordance with the invention, it is not essential to provide each electrode with an enlarged portion at both ends as shown in FIGS. 1 and 2.

In FIG. 3, only one end of each electrode has an enlarged portion 7.

In order to limit space requirements of the electrodes, it is observed in FIG. 3 that the enlarged ends 7 and non-enlarged ends of the electrodes are arranged in alternate sequence on each side of the array. FIG. 3 shows that a cut 8 is formed near the non-enlarged end of each electrode. Said cut 8 is located outside the seal 3.

The cut just mentioned makes it possible to short-circuit the electrodes by halves as shown in FIG. 3.

FIG. 4 shows how the method in accordance with the invention is applied after the panel has been tested by short-circuiting its electrodes.

In this figure, the contacts 6 close the peripheral electrode and the electrodes 2 are no longer in contact with the peripheral electrode. In order to repair the cut of the electrode 22, three deposits 5 of silver lacquer have been formed. In order to repair a single cut electrode, a single contact 6 is sufficient.

The cuts 8 which are formed near the nonenlarged end of each electrode make it possible to short-circuit the electrodes by halves as has already been noted in the foregoing.

These cuts 8 give rise to a further advantage which will be explained with reference to FIG. 4.

In this figure, the reference numeral 9 designates the end portion of each electrode which is separated from the remainder of the electrode by means of a cut 8.

Said end portion 9 is not supplied with current except in the event that it forms part of an electrode which has been cut and then repaired, such as the electrode 22 shown in FIG. 4.

This arrangement has the effect of reducing the risks of short-circuits at the ends of the electrodes.

It is only when an electrode is cut that its end portion 9 is supplied with current and that short-circuits are liable to occur between said end portion 9 and the enlarged ends of the adjacent electrodes.

It is known to protect the end portion 9 of a cut electrode in order to prevent short-circuits.

The formation of cuts 8 therefore makes it possible to reduce the pitch of the electrodes without increasing the potential hazards of short-circuits.

The method of repair in accordance with the invention can be employed at the same time as the known methods of repair.

What is claimed is:

1. A method for repairing cut electrodes of a display panel having two arrays of said electrodes formed on both faces of the panel, said electrodes supplied at one end, wherein said method comprises the following steps:

forming at least one peripheral electrode on each face of the panel surrounding each array of electrodes, and cutting said peripheral electrode to obtain peripheral electrode segments;

connecting both ends of a cut electrode of one array of electrodes to a peripheral electrode segment by means of a conductive deposit.

2. A method according to claim 1, wherein the peripheral electrode surrounding the array of electrodes is formed at the same time as the two electrode arrays of the panel.

3. A method according to claim 1, wherein the conductive deposit is formed by a deposited silver containing lacquer.

4. A method according to claim 3, wherein the silver containing lacquer is deposited by hand.

5. A method for repairing cut electrodes of a display panel having two arrays of said electrodes formed on both faces of the panel, said electrodes supplied at one end, wherein said method comprises the following steps:

forming at least one peripheral electrode on each face of the panel surrounding each array of electrodes, and cutting said peripheral electrode to obtain peripheral electrode segments;

connecting both ends of a cut electrode of one array of electrodes to a peripheral electrode segment by means of a conductive deposit, wherein each end of the electrodes of the arrays is provided with enlarged ends and non-enlarged ends in alternate sequence on each side of the electrode array.

6. A method according to claim 11, wherein at least one electrode of the arrays has a cut in proximity to the non-enlarged end of said electrode and wherein said cut is repaired by means of a conductive deposit.

7. A method according to claim 5, wherein each peripheral electrode which surrounds one array of electrodes, is cut so as to obtain at least two electrode segments and both ends of a cut electrode of one array of electrodes are connected to said peripheral electrode segment by means of a conductive deposit.

8. A method according to claim 6, wherein each peripheral electrode which surrounds one array of electrodes is cut so as to obtain at least two electrode segments and both ends of a cut electrode of one array of electrodes are connected to a peripheral electrode segment by means of a conductive deposit.

9. A method for repairing cut electrodes of a panel having arrays of electrically connected electrodes, wherein said method comprises:
  forming at least one peripheral electrode on the face of the panel surrounding each array of electrodes, wherein the peripheral electrode surrounding the array of electrodes is co-planar with the electrode arrays of the panel, and cutting said peripheral electrode to obtain peripheral electrode segments;
  electrically connecting both ends of a cut electrode via a peripheral electrode segment by means of a conductive deposit.

10. A method according to claim 9, wherein the conductive deposit is formed by a deposited silver containing lacquer.

11. A method according to claim 10, wherein the silver containing lacquer is deposited by hand.

* * * * *